US010908460B2

(12) United States Patent
Kosuge

(10) Patent No.: US 10,908,460 B2
(45) Date of Patent: Feb. 2, 2021

(54) METHOD OF MANUFACTURING ALIGNMENT FILM AND LIQUID CRYSTAL DISPLAY DEVICE

(71) Applicant: Japan Display Inc., Minato-ku (JP)

(72) Inventor: Masahiro Kosuge, Tokyo (JP)

(73) Assignee: Japan Display Inc., Minato-ku (JP)

(*) Notice: Subject to any disclaimer, the term of this patent is extended or adjusted under 35 U.S.C. 154(b) by 39 days.

(21) Appl. No.: 15/938,056

(22) Filed: Mar. 28, 2018

(65) Prior Publication Data
US 2018/0284545 A1  Oct. 4, 2018

(30) Foreign Application Priority Data

Mar. 31, 2017  (JP) ................................. 2017-071607

(51) Int. Cl.
*G02F 1/1337* (2006.01)

(52) U.S. Cl.
CPC .. *G02F 1/133788* (2013.01); *G02F 1/133711* (2013.01); *G02F 2202/023* (2013.01)

(58) Field of Classification Search
CPC ........ G02F 1/133788; G02F 1/133723; G02F 1/133711; G02F 2001/133715; G02F 2001/133726; G02F 2202/023; C09K 19/3809; C09K 19/56; C09K 2019/548; Y10T 428/1005; Y10T 428/1023
See application file for complete search history.

(56) References Cited

U.S. PATENT DOCUMENTS

2014/0347585 A1* 11/2014 Imanishi ........... G02F 1/133788
349/42
2018/0230384 A1* 8/2018 Jo ....................... C08G 73/1042
2018/0355249 A1* 12/2018 Saito ....................... C09K 19/12

FOREIGN PATENT DOCUMENTS

JP         2014-228841         12/2014

OTHER PUBLICATIONS

English language translation from Japanese of Patent Application Publication No. WO/2016/010003. Document downloaded from WIPO website at https://patentscope.wipo.int/search/en/search.jsf on Dec. 5, 2019. Translation provided by Google Translate tool on the WIPO website. (Year: 2015).*

* cited by examiner

*Primary Examiner* — Angela K Davison
(74) *Attorney, Agent, or Firm* — Oblon, McClelland, Maier & Neustadt, L.L.P.

(57) ABSTRACT

According to one embodiment, a method of manufacturing an alignment film, includes forming an organic layer on a substrate, irradiating polarized ultraviolet rays onto the organic layer to impart an alignment controllability of liquid crystal molecules, oxidating the organic layer irradiated with the polarized ultraviolet rays, washing the oxidated organic layer and reducing the washed organic layer.

6 Claims, 3 Drawing Sheets

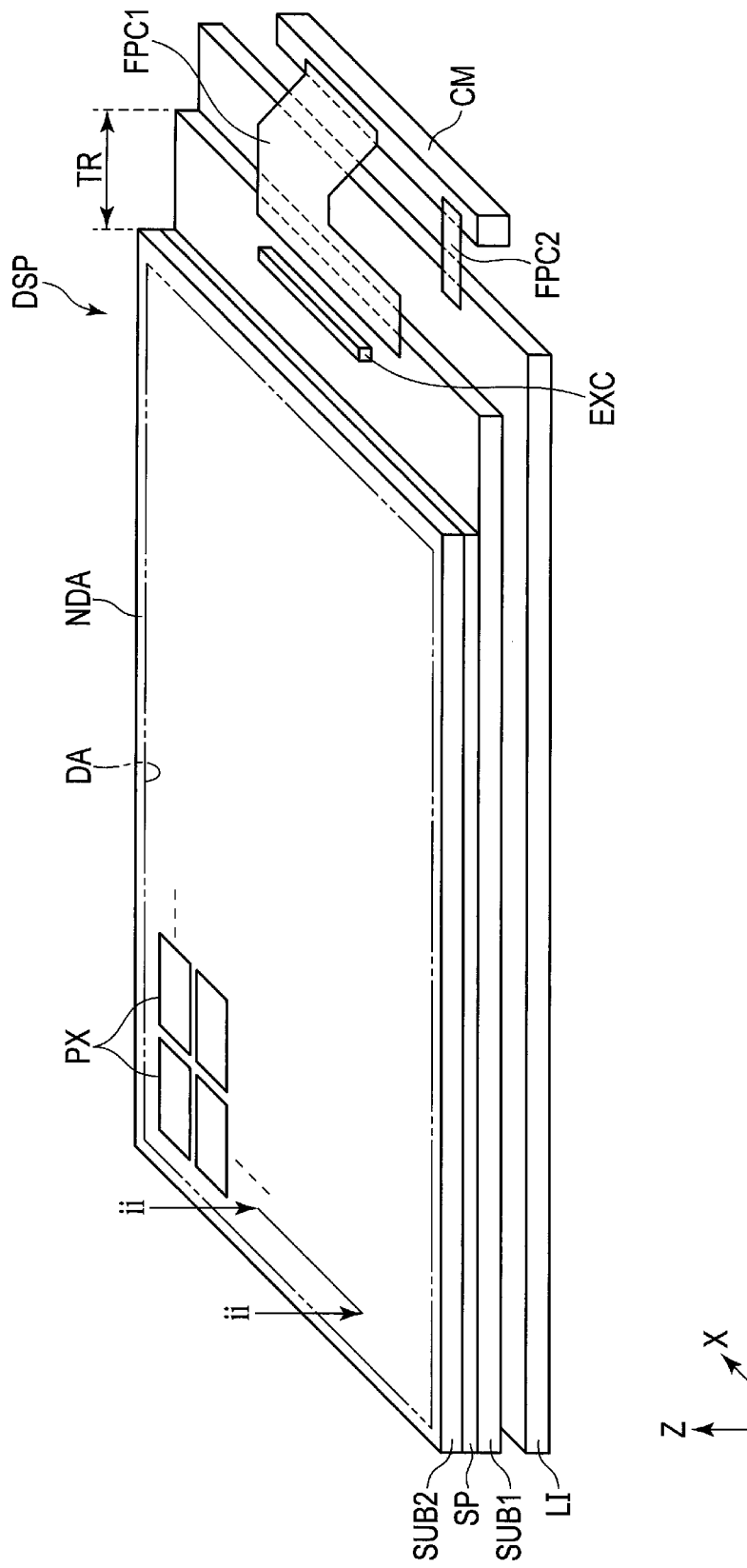
F I G. 1

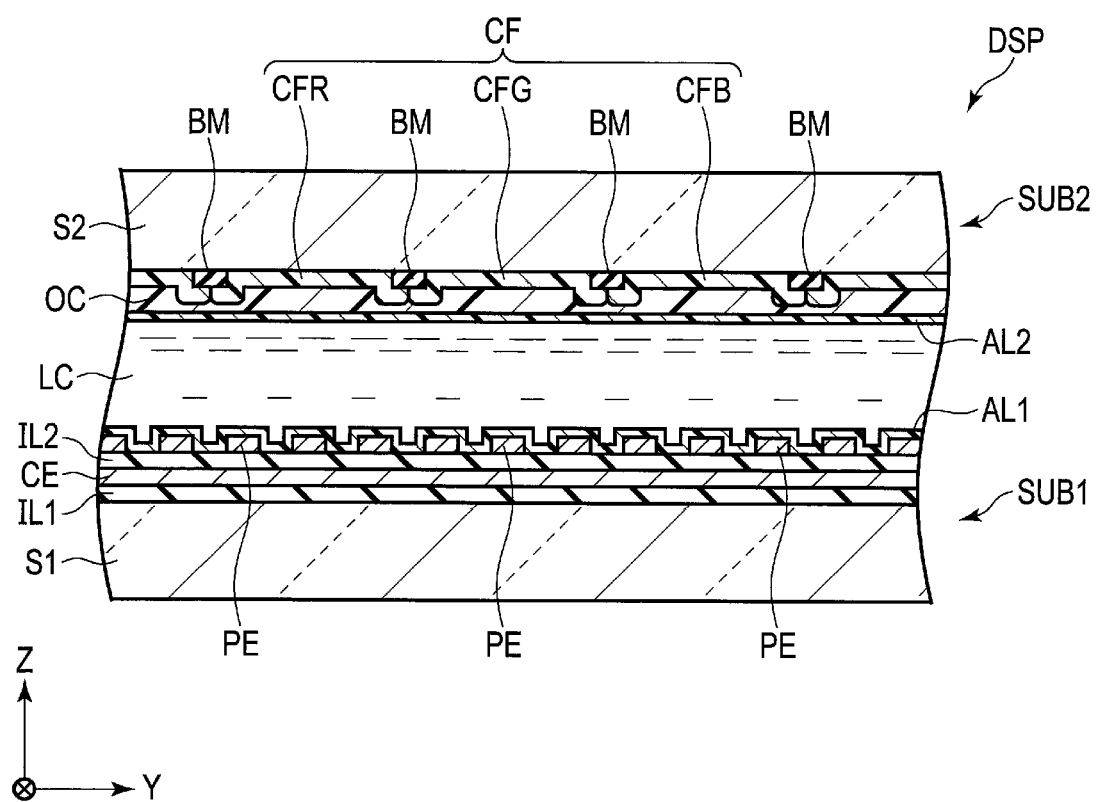
F I G. 2

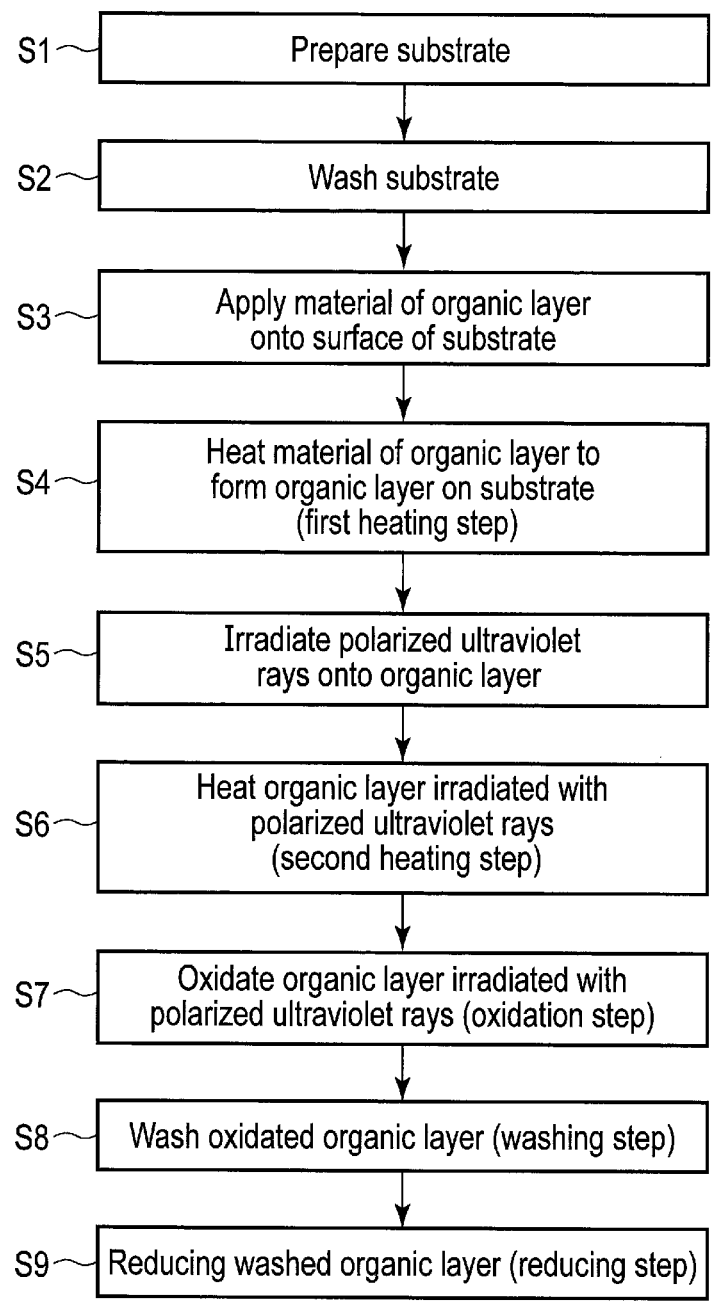
F I G. 3

METHOD OF MANUFACTURING ALIGNMENT FILM AND LIQUID CRYSTAL DISPLAY DEVICE

CROSS-REFERENCE TO RELATED APPLICATIONS

This application is based upon and claims the benefit of priority from Japanese Patent Application No. 2017-071607, filed Mar. 31, 2017, the entire contents of which are incorporated herein by reference.

FIELD

Embodiments described herein relate generally to a method of manufacturing an alignment film and a liquid crystal display device.

BACKGROUND

Liquid crystal display devices comprise a first substrate on which pixel electrodes, thin-film transistors (TFTs) and the like are formed in an matrix, and a second substrate disposed to be spaced from the first substrate so as to oppose thereto, on which color filters and the like are formed. Liquid crystals are enclosed between the first substrate and the second substrate. The liquid crystals are aligned by alignment films provided respectively in the first and second substrates.

Alignment films are prepared on substrates generally by applying a precursor organic compound (the material for an organic layer) dissolved into an organic solvent on a substrate, heating the material for the organic layer to be converted into an organic layer, and imparting alignment controllability to the organic layer.

As a method of imparting the alignment controllability to an organic layer, a non-contact optical alignment treatment has been adopted recently besides the rubbing process. As compared with the rubbing process, the optical alignment treatment is free from such problems as generation of static electricity and non-uniformity of the surface of a substrate, caused by unevenness thereof. In the optical alignment treatment, polarized ultraviolet rays in a band of, for example, 254 nm to 365 nm are irradiated onto an organic layer to cut the molecules of the organic layer in a direction parallel to the polarization direction, and thus uniaxial anisotropy is imparted to the organic layer in a direction normal to the polarization direction. The liquid crystal molecules are aligned by the alignment film to which the uniaxial anisotropy is imparted.

But the alignment film formed by the optical alignment treatment may undesirably cause a display error such as non-uniformity in display.

BRIEF DESCRIPTION OF THE DRAWINGS

FIG. 1 is a perspective view of a liquid crystal display device according to an embodiment.

FIG. 2 is a brief enlarged cross section of a part taken along line ii-ii in FIG. 1.

FIG. 3 is a flowchart for illustrating a method of manufacturing an alignment film according to an embodiment.

DETAILED DESCRIPTION

In general, according to one embodiment, a method of manufacturing an alignment film, comprises forming an organic layer on a substrate, irradiating polarized ultraviolet rays onto the organic layer to impart thereto an alignment controllability of liquid crystal molecules, oxidating the organic layer irradiated with the polarized ultraviolet rays, washing the oxidated organic layer and reducing the washed organic layer.

According to a second embodiment, a liquid crystal display device comprises a first substrate including an alignment film, a second substrate disposed to oppose an alignment film side of the first substrate and a liquid crystal layer disposed between the first substrate and the second substrate, a carbon concentration in a surface of the alignment film on a side of the liquid crystal layer being lower than a carbon concentration inside the alignment film.

Recently, there is a demand for reducing the power consumption of the liquid crystal display devices. One of the power reducing methods is the so-called low frequency driving, in which liquid crystal display devices are driven at a lower frame frequency for updating the image signal, than usual 60 Hz.

The authors of the present embodiments have found that when a liquid crystal display device employing an alignment subjected to an oxidation treatment and a solvent treatment in a washing step, in addition to the optical alignment treatment, is driven at low frequency, display errors which might be caused by the low-molecular components produced in the optical alignment treatment can be improved as compared to a liquid crystal display employing an alignment film subjected to the optical alignment treatment only. However, at the same time, they have also confirmed that when a liquid crystal display device is driven at low frequency, some other error than those created with driving at usual frequencies, that is, a flicker occurs to be obvious. Although a definite reason for this is not certain, it is inferred that oxidated functional groups, substituents and the like on which the surface of the alignment film, on a liquid crystal side, eluded as ionic material to the liquid crystals.

Under these circumstances, the authors of the embodiments have found a method of manufacturing an alignment film, with a step of reducing the washed organic layer, which can suppress the occurrence of obvious flickers caused by driving of the liquid crystal display at low frequency even if the oxidation treatment and solvent treatment are carried out.

Further, they have also found a liquid crystal display device which can suppress the occurrence of visible flickers even if driven at low frequency.

Some embodiments will be described hereinafter with reference to drawings. Note that in some cases, in order to make the description clearer, the widths, thicknesses, shapes, etc., of the respective parts are schematically illustrated in the drawings and compared to the actual modes. However, the schematic illustration is merely an example, and adds no restrictions to the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

First, a liquid crystal display device according to an embodiment will be explained with reference to FIGS. 1 and 2. FIG. 1 is a perspective view illustrating a liquid crystal display device DSP according to the embodiment. FIG. 2 is a brief enlarged cross section of a part taken along line ii-ii in FIG. 1.

In this embodiment, a direction parallel to a short edge of the liquid crystal display device DSP is defined as a first direction X, a direction parallel to a long edge of the display device DSP is defined as a second direction Y and a direction perpendicular to the first direction X and the second direction Y is defined as a third direction Z. The first direction X and the second direction Y are orthogonal to each other, but may intersect at an angle other than 90°. In this embodiment, a positive direction of the third direction Z is defined as up or above and a negative direction of the third direction Z is defined as down or below.

The liquid crystal display device DSP comprises a first substrate SUB1 and a second substrate SUB2 disposed to oppose each other. The first substrate SUB1 comprises a terminal portion TR. The second substrate SUB2 opposes the first substrate SUB1 except for the terminal portion TR of the first substrate SUB1. In other words, the terminal portion TR of the first substrate SUB1 extends over an edge of the second substrate SUB2.

In a region of the first substrate SUB1, which opposes the second substrate SUB2, pixel electrodes PE, a common electrode CE, etc., are provided. On the terminal portion TR of the first substrate SUB1, an external circuit EXC is provided. The second substrate SUB2 comprises a color filter CF, a light-shielding layer BM, etc., formed therein.

The first substrate SUB1 and the second substrate SUB2 defines a certain cell gap therebetween, and a peripheral portion of the first substrate SUB1 except for the terminal portion TR and a peripheral portion of the second substrate SUB2 are attached to each other with a frame-shaped sealing member SP. In an inner side of the sealing member SP, liquid crystals are enclosed to form a liquid crystal layer LC. The frame-shaped sealing member SP and the light-shielding layer BM defines a non-display area NDA. The non-display area NDA defines an image display area DA on an inner side thereof. The image display area AD is, for example, substantially rectangular, and comprises m×n pixels PX arrayed in a matrix, where m and n are positive integers.

A light irradiation unit LI disposed on an opposite side to the second substrate SUB2 with respect to the first substrate SUB1 corresponds to the so-called backlight unit, which illuminates the image display area from a first substrate SUB1 side. In the terminal portion TR of the first substrate SUB1, a flexible printed circuit FPC1 is provided on a distal end side with respect to the external circuit EXC. The flexible printed circuit FPC1 electrically connects the first substrate SUB1 and a control module CM to each other. The control module CM is provided with a flexible printed circuit FPC2. The flexible printed circuit FPC2 electrically connects the control module CM and the light irradiation unit LI to each other. The flexible printed circuits FPC1 and FPC2 transmit drive signals of the control module CM respectively to the first substrate SUB1 and the light irradiation unit LI.

The liquid crystal display device DSP with such a structure corresponds to the so-called transmissive liquid crystal display with the transmissive display function which displays images by selectively transmitting light entering the first substrate SUB1, the liquid crystal layer LC and the second substrate SUB2 from the light irradiation unit LI by the pixels PX.

As illustrated in FIG. 2, the first substrate SUB1 comprises a first base substrate S1. The first base substrate S1 is a light-transmissive insulating substrate of, for example, glass.

On a surface of the first base substrate S1, which is on a side of the liquid crystal layer LC, a first insulating film IL1 is provided. The first insulating film IL1 may be formed from an organic material such as an acrylic resin.

On a surface of the first insulating film IL1, which is on a side of the liquid crystal layer LC, the common electrode CE is provided. The common electrode CE may be formed from, for example, a light-transmissive conductive material such as indium tin oxide (ITO) or indium zinc oxide (IZO) or a light-reflective conductive material containing Ag, Al, an Al alloy or the like.

On a surface of the common electrode CE, which is on a side of the liquid crystal layer LC, a second insulating film IL2 is provided. The second insulating film IL2 may be formed from, for example, an inorganic material such as silicon oxide or silicon nitride.

On a surface of the second insulating film IL2, which is on a side of the liquid crystal layer LC, the pixel electrodes PE are provided. The pixel electrodes PE oppose the common electrode CE via the second insulating film IL2. The pixel electrodes PE each comprise a slit formed therein. The slit penetrates the respective pixel electrode PE to partially expose the surface of the second insulating film IL2. The pixel electrodes PE may be formed from, for example, a light-transmissive conductive material such as ITO or IZO.

On a surface of the first substrate SUB1, which is on a side of the liquid crystal layer LC, a first alignment film AL1 is disposed. The first alignment film AL1 covers the second insulating film IL2 and the pixel electrodes PE. The first alignment film AL1 is an organic layer to which uniaxial anisotropy in a direction normal to the polarization direction has been imparted by irradiating polarized ultraviolet rays onto the organic layer to cut the molecules of the organic layer in a direction parallel to the polarization direction. The first alignment film AL1 is, for example, photolytic polyimide in which the molecules are cut when subjected to optical alignment treatment.

The second substrate SUB2 comprises a second base substrate S2. The second base substrate S2 is a light-transmissive insulating substrate of, for example, glass.

The color filter CF is provided on a surface of the second base substrate S2, on a side of the liquid crystal layer LC. In the color filter CF, sets of red (R), green (G) and blue (B) filter segments (subpixels) CFR CFG and CFB are arranged periodically. A set of the three color subpixels constitute one pixel.

Between each adjacent pair of red, green and blue filter segments CFR, CFG and CFB and on the frame-like non-display area NDA, the light-shielding layers BM are disposed. The light-shielding layers BM on the image display region DA are arranged in a grating pattern in plan view, to partition the red, green and blue filter segments CFR, CFG and CFB from each other and prevent color mixture between adjacent filter segments. The light-shielding layers BM are, for example, a black resin, a low-reflective metal or the like.

An overcoat layer OC is disposed to cover the filter segments CFR, CFG and CFB and the light-shielding layers BM. The overcoat layer OC covers the unevenness of the surface of the filter segments CFR, CFG and CFB and the light-shielding layers BM to form a flat surface (planarization film).

On a surface of the second substrate SUB2, on a side of the liquid crystal layer LC, a second alignment film AL2 is disposed. The second alignment film AL2 is, for example, a photolytic polyimide as in the case of the first alignment film AL1.

The sealing member SP attaches the peripheral portion of the first substrate SUB1 except for the terminal portion TR, to the peripheral portion of the second substrate SUB2 in a frame shape. The sealing member SP is formed from, for example, a sealing material such as an ultraviolet curing resin or thermosetting resin, by way of continuously drawing from a starting point to a finishing point using a dispenser or the like.

The liquid crystal layer LC is provided between the first substrate SUB1 except for the terminal portion TR and the second substrate SUB2. More specifically, the liquid crystal layer LC is disposed between the first alignment film AL1 and the second alignment film AL2.

The liquid crystal display device DSP having such a structure that a common electrode CE and pixel electrodes PE are formed on the first substrate SUB1, is an In-Plane Switching (IPS) mode liquid crystal display device that utilizes the so-called lateral electric in which the electric field applied to the liquid crystals when driven is substantially parallel to the first substrate SUB1.

Hereafter, a method of manufacturing an alignment film according to an embodiment will be described with reference to FIG. 3. FIG. 3 is a flowchart for illustrating the method of manufacturing the alignment film according to the embodiment.

First, a substrate is prepared (step S1). More specifically, the above-described first substrate SUB1 or second substrate SUB2 is prepared.

Next, a surface of the substrate, on which an alignment film is to be formed, is washed using a surface treatment method such as a UV/ozone method, excimer UV method or an oxygen plasma process (step S2).

Next, a precursor organic compound (the material of the organic layer) dissolved into an organic solvent is applied onto a surface of the substrate using a printing method such as screen printing, flexo printing, or ink jet printing (step S3). The precursor organic compound is, for example, polyamic acid-based compound such as polyamic ester or polyamic acid ester, which is a precursur of polyimide.

Next, the material of the organic layer is heated (first heating step) (step S4). In the first heating step, the material of the organic layer is converted into an organic layer. Thus, the organic layer is formed on the substrate. When the first heating step is carried out at a temperature of 170° C. or less, the precursor organic compound undesirably may not be converted sufficiently into the organic layer. When the first heating step is carried out at a temperature of 270° C. or higher, the organic layer undesirably may color. Therefore, the heating temperature in the first heating step should preferably be 170° C. to 270° C.

The organic layer (polyimide) formed on the substrate in the first heating step (step S4) is, for example, a high molecular compound represented by formula (1) below. Here, the formula in the parenthesis ([ ]) is a repeating unit of the chemical structure, and a subscript n indicates the number of repeating units. Further, letter A represents a quadravalent organic group and D represents a divalent organic group. Examples of the letter A are aliphatic cyclic compounds such as cyclobutane, cyclopentane and cyclohexane and those to which a substituent group is bound. Examples of D are aromatic cyclic compounds such as phenylene, biphenylene, oxybiphenylene, biphenyleneamine, naphthalene and anthracene, aliphatic cyclic compounds such as cyclohexane and bicyclohexane, and those to which a substituent group is bound.

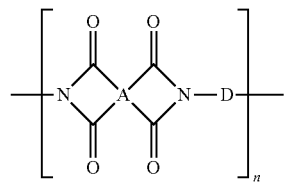

These polyimide are formed on the substrate in the first heating step, in which the precursor organic compound (the material of the organic layer) applied on the surface of the substrate is heated. Further, the precursor organic compound applied in step S3 is a polyamic acid or polyamic acid ester high molecular compound represented by formula (2). Here, $R^1$ and $R^2$ are alkyl chains of H or $—C_mH_{2m+1}$, and m is 1 or 2.

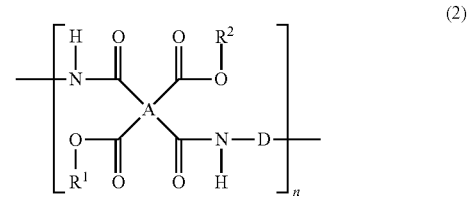

Next, polarized ultraviolet rays are irradiated onto the organic layer to impart the alignment controllability of liquid crystal molecules is imparted thereto (step S5). When the polarized ultraviolet rays are irradiated, the alicyclic skeleton of the polyimide molecules which form the organic layer is cut, thereby imparting the uniaxial anisotropy in a direction normal to the polarization direction, to the organic layer.

Next, the organic layer subjected to the irradiation of the polarized ultraviolet rays is heated (second heating step (step S6)). By the second heating step, low molecular components or unreacted monomers, created by cutting the polyimide molecules in step S5, are relinked or bound to uncut molecules. As in the first heating step, the second heating step may be performed carried out at a temperature from 170° C. to 270° C. In this manner, the alignment controllability can be further improved.

Next, the organic layer subjected to the irradiation of the polarized ultraviolet rays is oxidated ((oxidation step) step S7). The oxidation step can be carried out by, for example, exposing the organic layer to an oxidative atmosphere using ozone gas generated from the air by the source of ultraviolet rays. Alternatively, the oxidation step can be performed by immersing the organic layer in an oxidating solvent (such as a hydrogen peroxide solution, a hypochlorous acid solution, ozone water, a hypoiodite solution or a permanganate acid solution). With the oxidation step, the low-molecular components and unreacted monomers remaining in the organic layer can be oxidatively decomposed.

Next, the organic layer thus oxidated is washed with a solvent ((washing step) step S8). With the washing step, the low-molecular components and unreacted monomers oxidatively decomposed and remaining in the organic layer can be removed. The organic layer thus oxidated is washed with a solvent by immersing the organic layer in an oxidating solvent or organic solvent. Examples of the oxidating solvent are similar to those listed above.

Examples of the organic solvent are a ketone-based solvent, ester-based solvent, ether-based solvent, an alcohol-based solvent, hydrocarbon-based solvent and halogenated hydrocarbon-based solvent.

Examples of the ketone-based solvent are acetone, methylethylketone, methylisobutylketone, cyclohexanone and diacetone alcohol.

Examples of the ester-based solvent are ethyl acetate, ethyl formate, methyl acetate, butyl acetate, methoxybutyl acetate, cellosolve acetate, amyl acetate, normal propyl acetate, isopropyl acetate, methyl lactate, ethyl lactate and butyl lactate.

Examples of the ether-based solvent are diethylether, isopropyl ether, methyl cellosolve, cellosolve, butyl cellosolve, dioxane, methyl tertiary-butyl ether (MTBE) and butyl carbitol.

Examples of the alcohol-based solvent are methanol, ethanol, butanol, isopropyl alcohol, normal propyl alcohol, butanediol, ethylhexanol and benzyl alcohol.

Examples of the hydrocarbon-based solvent are aliphatic or aliphatic cyclic hydrocarbons such as hexane, heptane, octane, petroleum ether, ligroin, cyclohexane and methyl cyclohexane, and aromatic hydrocarbons such as benzene, toluene and xylene.

Examples of the halogenated hydrocarbon-based solvent are alkyl halides such as methylene chloride, chloroform, carbon tetrachloride and dichloroethane; alkenyl halides such as trichloroethylene and tetrachloroethylene; and aryl halides such as mono-chlorobenzene and dichlorobenzene.

Note that when an oxidating solvent is used in the oxidation step of step S7, the step S7 can serve also as the washing step of step S8.

Subsequently, after drying the washed organic layer, it is then reduced ((reducing step) step S9). The reducing step can be carried out by heating the organic layer (the third heating step). This heating step can be carried out at a temperature of 170° C. to 270° C. as in the first heating step and the second heating step. Thus, for example, the first alignment film AL1 or second alignment film AL2 can be formed.

In this embodiment, the steps S4 to S9 are executed continuously without interposing another step between any two consecutive steps.

Here, in order to examine the details of the reducing step, a sample of the organic layer obtained in from steps S1 to S8 was subjected to a Temperature Programmed Desorption-Mass Spectrometry (TPD/MS) method, in which gas and organic components generated from the sample under atmospheric pressure were qualitatively and quantitatively analyzed.

The results indicated that when the organic layer was heated at a temperature of 170° C. to 270° C. in the reducing step, a component of a molecular weight of 44, (carbon dioxide), was produced from the organic layer. In other words, when the organic layer is heated at the above-specified temperature, carbon dioxide is removed from the organic layer, thereby reducing the organic layer. Note that even if the organic layer was heated at the above-specified temperature, a component of a molecular weight of 28 (for example, nitrogen or carbon monoxide) or a component of a molecular weight of 32 (for example, oxygen) was not substantially detected as compared to the component of a molecular weight of 44.

Further, samples of an organic layer (polyimide) subjected to steps S1 to S6 (before step S7), another organic layer subjected to steps S1 to S8 (after step S8) and still another organic layer subjected to steps S1 to S9 (after step S9) were subjected to an XPS method, in which the samples were measured in terms of elemental composition. An X-ray photoelectron spectral device, AXIS-HS of Shimazu/Kratos was used. The measurement conditions were X radiation source monochrome Al (a tube voltage of 15 kV and a tube current of 15 mA), and the lens conditions were Hybrid (an analysis area of 600×1000 µm), a resolution of Pass Energy 40 and a scanning speed of 20 eV/min (0.1 eV step).

The results of the evaluation are summarized in Table 1 below.

TABLE 1

| | Elemental composition ratio of polyimide (% by atom) | | |
|---|---|---|---|
| | Carbon | Nitrogen | Oxygen |
| Before step S7 | 71.21 | 9.80 | 18.99 |
| After step S8 | 69.29 | 9.85 | 20.86 |
| After step S9 | 70.31 | 10.16 | 19.52 |

Table 2 is obtained in consideration of the fact that the composition ratio of nitrogen did not substantially vary before and after each step as compared to the composition ratio of carbon or oxygen (see the results of Table 1), in which the composition ratio of nitrogen was standardized as an invariable.

TABLE 2

| | Elemental composition ratio of polyimide (% by atom) | | |
|---|---|---|---|
| | Carbon | Nitrogen | Oxygen |
| Before step S7 | 73.8 | 10.2 | 19.7 |
| After step S8 | 71.5 | 10.2 | 21.5 |
| After step S9 | 70.3 | 10.2 | 19.5 |

As is clear from the results provided above, the composition ratio of carbon decreased after step S8. This is because the low-molecular components and unreacted monomers oxidatively decomposed were removed from polyimide. Then, after step S9, carbon dioxide was removed from the polyimide, and thus the composition ratio of carbon further decreased.

The composition ratio of oxygen increased after step S8 when the polyimide was oxidated, but after step S9, it decreased to the level before step S7 when carbon dioxide was removed from the polyimide.

Such variation in the composition ratio of the polyimide (alignment film) appears on the surface of the alignment film on a side of the liquid crystal layer, more easily than the inside of the alignment film, because the surface is susceptible to the influence of the immersion to the solvent in the washing step and heat in the reducing step.

Therefore, in the alignment film formed on the substrate by the method of manufacturing an alignment film according to the embodiment, the carbon concentration on the surface of the alignment film on the liquid crystal layer side becomes lower than that inside the alignment film. This is because the low-molecular components and unreacted monomer are removed by the washing step from the polyimide and carbon dioxide is removed therefrom by the reducing step.

Further, in the alignment film, the ratio of the carbon concentration to the oxygen concentration in the surface of the alignment film on the liquid crystal layer side becomes lower than the ratio of the carbon concentration to the oxygen concentration inside the alignment film. This is because the low-molecular components and unreacted monomers are removed from the polyimide by the washing step and carbon dioxide is removed therefrom by the reducing step.

Furthermore, in the alignment film, the ratio of the nitrogen concentration to a total value of the oxygen concentration, carbon concentration and nitrogen concentration in the surface of the alignment film on the liquid crystal layer side becomes higher than the ratio of the nitrogen concentration to a total value of the oxygen concentration, carbon concentration and nitrogen concentration inside the alignment film. This is because the composition ratio of nitrogen does not substantially vary before and after each step in addition to the results in which the low-molecular components containing carbon elements and the unreacted monomers are removed from the polyimide by the washing step and carbon dioxide is removed therefrom by the reducing step.

As described above, in the liquid crystal display incorporating an alignment film prepared by the method of manufacturing an alignment film according to the embodiment, those materials which may elute to the liquid crystals as ionic substances from the liquid crystal layer-side surface of the alignment film, (namely, for example, functional groups, substituents, low-molecular components, unreacted monomers, etc., which are oxidated) are removed. Therefore, even if the liquid crystal display is driven at low frequency, flickers are prevented or controlled from occurring to be visible. Thus, the alignment film manufacturing method of the embodiment can be employed to manufacture a liquid crystal display which uses a frame frequency of lower than 60 Hz. The frame frequency can be set to, for example, 30 Hz or lower.

The above-described embodiment is described in connection with an IPS-mode liquid crystal display which utilizes a lateral electric field as an example of the liquid crystal displays, but the present embodiment is also applicable to an fringe field switching (FFS)-mode liquid crystal display which utilizes a lateral electric field. Further, the embodiments is also applicable to liquid crystal displays of some other mode, for example, which mainly utilize a vertical electric field, such as a twisted nematic (TN) mode, optically compensated bend (OCB) mode and vertical aligned (VA) mode.

Note that the event in which flickers occur to be visible in a low-frequency drive liquid crystal display devices due to the elution of ionic substances from the liquid crystal layer-side surface of the alignment film to the liquid crystals, is observed more notably in liquid crystal displays utilizing a lateral electric field than in liquid crystal displays using a vertical electric field. This is because the liquid crystal displays using a lateral electric field tend to be affected greater by the influence of a decrease in the voltage retention of the liquid crystal layer due to the elution of ionic substances to liquid crystals. Therefore, the alignment film manufacturing method of the embodiment is preferable for manufacturing liquid crystal displays utilizing a lateral electric field, but the use is not limited to this.

Moreover, as an example of the liquid crystal display device, the transmissive liquid crystal display device is described above, but the liquid crystal display device DSP may be, for example, the so-called transreflective liquid crystal display device which comprises also a reflective display function which displays images by selectively reflecting outdoor daylight entering from the outside in each of the pixels PX. The transreflective liquid crystal display device may comprise a front light unit disposed on an observer side of the liquid crystal display device DSP as a light source.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing an alignment film, comprising the steps of:
   forming an organic layer on a substrate by applying a material of the organic layer on the substrate and heating the applied material of the organic layer;
   irradiating polarized ultraviolet rays onto the organic layer to impart thereto an alignment controllability of liquid crystal molecules;
   heating the organic layer irradiated with the polarized ultraviolet rays at 170° C. to 270° C.;
   oxidating the heated organic layer;
   washing the oxidated organic layer;
   drying the washed organic layer, and
   heating the dried organic layer, thereby removing carbon dioxide from the dried organic layer.

2. The method of claim 1, to be employed for manufacture of a liquid crystal display device which uses a frame frequency of less than 60 Hz.

3. The method of claim 1, wherein
a ratio of a nitrogen concentration to a total value of an oxygen concentration, a carbon concentration and the nitrogen concentration in a surface of the alignment film, which is not in contact with the substrate, is higher than a ratio of a nitrogen concentration to a total value of an oxygen concentration, a carbon concentration and the nitrogen concentration inside the alignment film.

4. The method of claim 1, wherein
the step of washing comprises washing the oxidated organic layer with an organic solvent selected from the group consisting of a ketone-based solvent, an ester-based solvent, an ether-based solvent, an alcohol-based solvent, a hydrocarbon-based solvent and a halogenated hydrocarbon-based solvent.

5. The method of claim 1, wherein
a temperature at which the dried organic layer is heated is 170° C. to 270° C.

6. The method of claim 5, to be employed for manufacture of a liquid crystal display device which uses a frame frequency of less than 60 Hz.

* * * * *